May 11, 1965 G. SMITH 3,183,324

ELECTROMAGNETIC RELAYS

Filed Dec. 5, 1962 2 Sheets-Sheet 1

INVENTOR.
GRAYDON SMITH

BY

Morgan, Finnegan, Durham & Pine

ATTORNEYS

INVENTOR.
GRAYDON SMITH
BY
Morgan, Finnegan, Durham & Pine
ATTORNEYS

United States Patent Office 3,183,324

Patented May 11, 1965

3,183,324

ELECTROMAGNETIC RELAYS

Graydon Smith, Concord, Mass., assignor to Connecticut Valley Enterprises, Incorporated, Essex, Conn., a corporation of Connecticut Filed Dec. 5, 1962, Ser. No. 242,528
14 Claims. (Cl. 200—87)

This invention relates to electromagnetic relays and more particularly to high performance relays having rotary armatures, balanced moving systems, and a low mounting height, i.e., they are small in the dimension perpendicular to the surface on which the relays are mounted.

In recent years there has evolved a distinct need for a relay that could meet the high performance requirements of military specifications, such as high altitude operation, long life, and shock and vibration resistance, and a relay that at the same time would have a low mounting height, i.e., be small in dimension perpendicular to the surface on which the relay is mounted. With the increasing use of printed circuit boards the need for a relay having a low mounting height has recently become more acute. Printed circuit boards are frequently stacked parallel to each other a short distance apart, usually about one-half inch. This customary spacing of printed circuit boards, when stacked together, has led to the creation of a family of electrical components having a maximum mounting height of about three-eighths inch. In the past, efforts to produce a satisfactory electromagnetic relay having a low mounting height, or a mounting height of not more than about three-eighths inch, primarily for use with printed circuit boards, have not met with much practical success.

Accordingly, it is a primary object of this invention to provide a new and improved, high performance relay that has a low overall mounting height and a balanced moving system.

Another object of this invention is to provide a new and improved, high performance relay that has a very low overall mounting height and that simultaneously achieves the additional objects of:

(1) Location and arrangement of the armature-actuator system to permit use of long resilient movable contacts and resilient normally-open fixed contacts to contribute to over-travel;

(2) Arrangement of the armature-actuator system and the movable contacts so that the apparent axis of rotation (flexure axis) of the movable contacts is identical to the axis of rotation of the armature-actuator system; this arrangement prevents galling and wearing of the movable contacts by the contact actuators;

(3) Balancing the armature-actuator system (moving system) about its axis of rotation so that any translational force applied to the moving system will act at the center of gravity or axis of the sytsem and will not cause rotation; and (4) An efficient magnetic structure that develops a high working torque partly by providing a non-working air gap of large area and a rotary armature having a long lever arm.

A further object of this invention is to provide a new and improved, high performance relay that has a low overall mounting height and that can be made in the form of a two, three, four or more pole relay by merely increasing the length of the relay and without any increase in its mounting height. The number of poles or electrical switches capable of being included in the relay is limited only by the available power and the length of the relay. Further, the power of the relay of this invention may be increased to permit the use of additional electrical switches, or for other reasons, by using two motors at opposite ends of the relay, without any increase in the overall mounting height of the relay.

High performance relays capable of meeting military specifications must usually be hermetically sealed. One means by which the electrical leads for the relay coil and contacts are brought to the outside of the relay is by the use of a device commonly called a "header." Headers are usually metallic with glass beads surrounding and insulating the electrical leads from the body of the header. Headers usually have substantial thickness to insure a good glass seal. A typical header may thus be thick enough to take up as much as one third of the available mounting height on a printed circuit board, when the header is parallel to the mounting surface, as it would normally be.

Accordingly, it is a further object of this invention to provide a new and improved electromagnetic relay having a recess in its header to accommodate the relay coil and thereby reduce the overall mounting height of the relay. The header may also, and preferably does, include a second recess to accommodate and provide clearance for the actuator bar of the armature-actuator system.

Still further objects of this invention are to provide a new and improved, high performance, shock and vibration resistant relay that is capable of being adjusted after its assembly into an operating relay and before hermetic sealing of the relay cover to the header, that achieves an unsymmetrical but balanced moving system, and that achieves all of the foregoing objects without sacrifice of operating characteristics.

Additional objects and advantages of the invention will be set forth in part in the description which follows, and in part will be obvious from the description, or may be learned by practice of the invention, the objects and advantages being realized and attained by means of the instrumentalities and combinations particularly pointed out in the appended claims.

To achieve the foregoing objects and in accordance with its purpose, as embodied and broadly described, the electromagnetic relay of this invention comprises a header, a U-shaped electromagnet carried by the header, a moving system having an axis of rotation and comprising a rotary armature and an actuator secured to the rotary armature and rotatable therewith, the moving system being unsymmetrical but balanced about its axis of rotation, at least one movable contact carried by the header, and at least one fixed contact also carried by the header.

The invention consists in the novel parts, constructions, arrangements, combinations and improvements shown and described. The accompanying drawings, which are incorporated in and constitute a part of this specification, illustrate one embodiment of the invention and, together with the description, serve to explain the principles of the invention.

It is to be understood that both the foregoing general description and the following detailed description are exemplary and explanatory but are not restrictive of the invention.

Reference will now be made in detail to the present preferred embodiment of the invention, an example of which is illustrated in the accompanying drawings.

Figure 1:
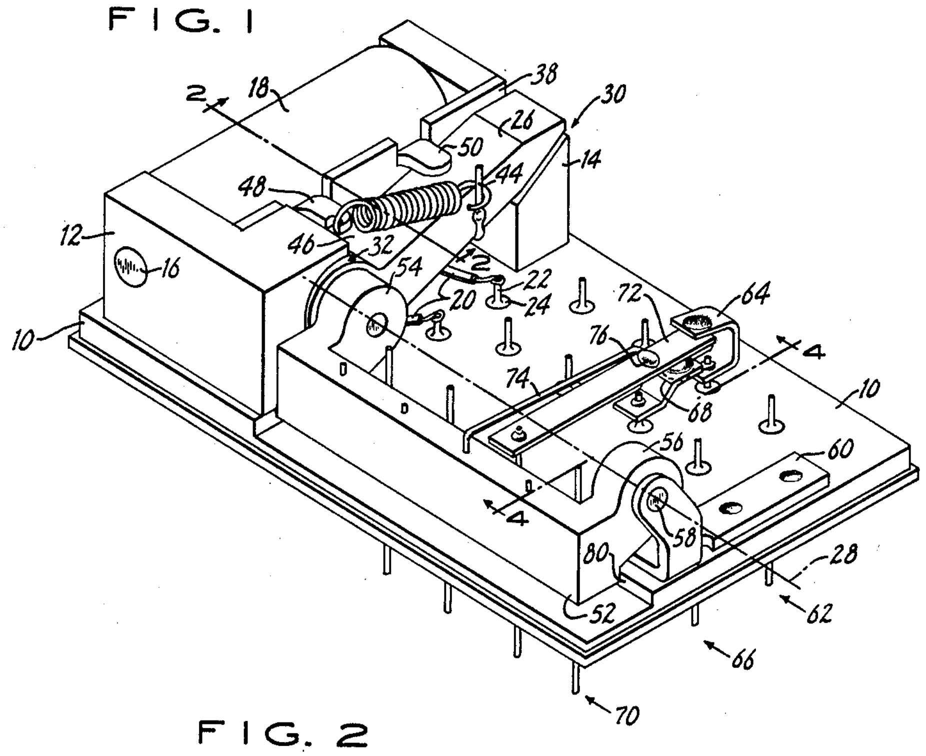
FIG. 1 is a perspective view of the relay with the cover or outer casing removed to show the operating parts; three of the four contact actuators and contact assemblies have been omitted for clarity.
Figure 2:
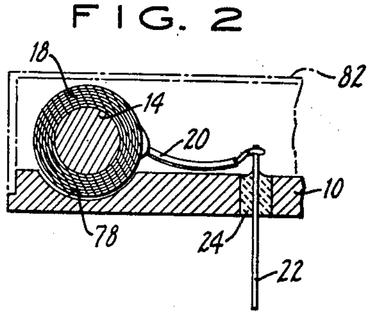
FIG. 2 is a partial sectional view taken along the line 2—2 of FIG. 1 and showing how the coil of the relay fits into a recess in the header.
Figure 3:
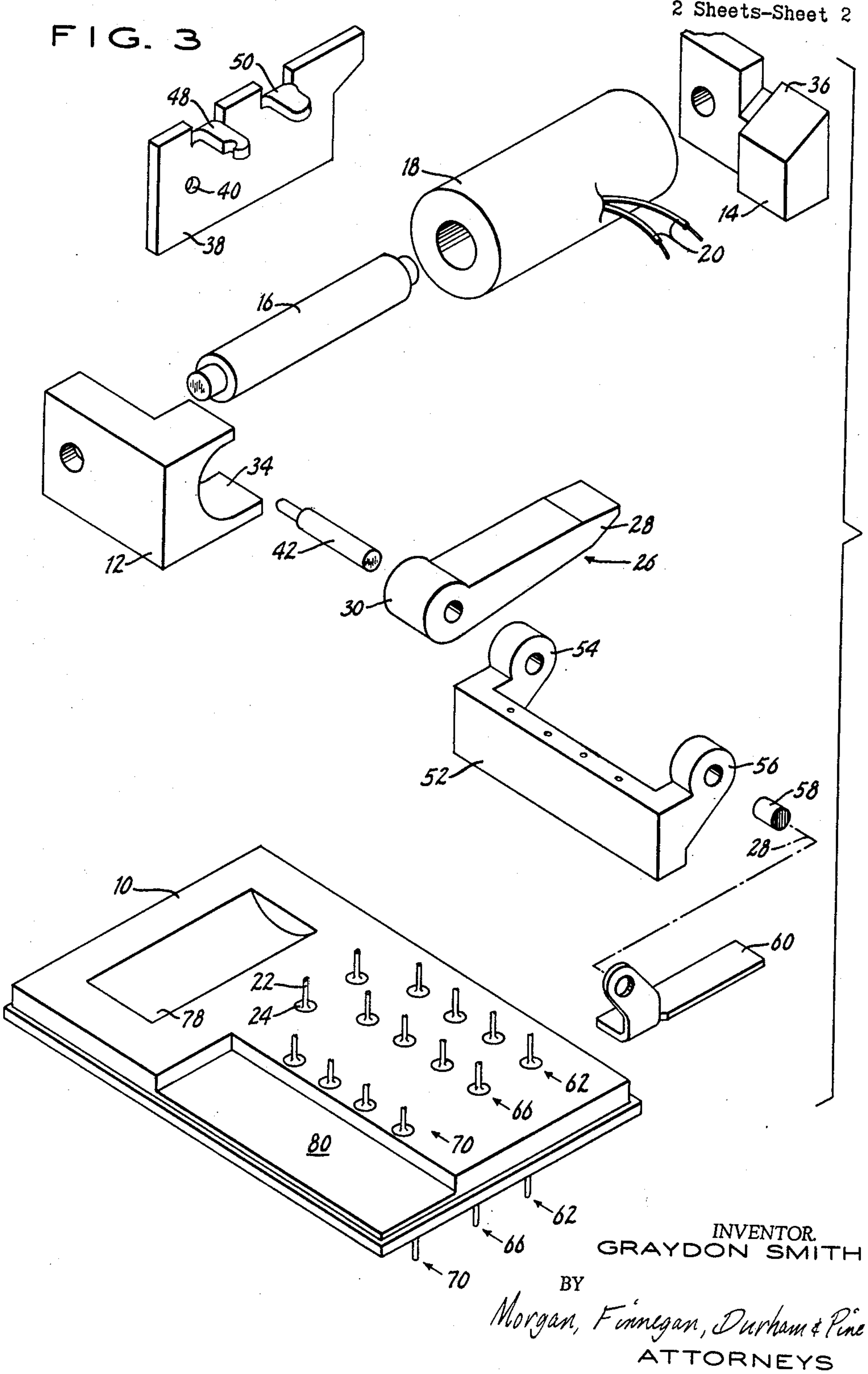
FIG. 3 is an exploded perspective view showing the header and parts of the motor portion of the relay in detail.

As shown in FIGS. 1 and 3, the relay of this invention comprises a header or base 10, and in accordance with the invention, the entire relay structure or mechanism is carried by the header. The motor portion of the relay comprises a U-shaped electromagnet including two legs 12 and 14, and a core piece 16. In this embodiment, the legs 12 and 14 are formed from two independent pieces, and core piece 16 is attached to them. A coil or winding 18 surrounds the core piece 16 and carries the electrical current which serves to energize the U-shaped electromagnet. Electrical current is fed to the coil through coil leads 20 which are attached to terminal pins 22 that run through the header 10, as best shown in FIG. 2. The header 10 includes a plurality of terminal pins like the terminal pin 22 and each of these terminal pins is insulated from the header proper by a suitable insulating and sealing material, such as glass, as shown at 24 (FIG. 2).

In accordance with the invention, means are provided for developing the maximum useful torque from the motor portion of the relay while leaving the major portion of the header free for carrying the electrical or switching system of the relay, and for achieving a relay having a minimum overall mounting height.

As embodied, this means comprises a rotary armature 26 having an axis of rotation 28, a working air gap 30 at the end of the armature farthest from the axis of rotation 28, and a passive or non-working air gap 32 adjacent the armature axis 28. The coil 18 of the relay has to force flux across these two air gaps 30, 32 in series, but only one air gap, the working air gap 30, develops a force tending to rotate the armature, although because of the long lever arm from the armature axis of rotation 28 to the working air gap 30, a good torque is developed. Since the non-working air gap 32 does not contribute to the torque on the armature, it is not necessary to design it to develop force, and the parts, including the passive pole face 34 (FIG. 3), can be proportioned to reduce the reluctance of the non-working air gap 32 as much as possible, thus reducing the number of ampere turns required. As shown in FIGS. 1 and 3, the area of the non-working air gap 32 is about double that of the working air gap 30.

Figure 5:
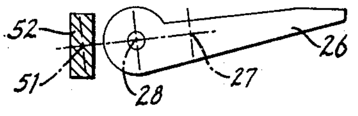
FIG. 5 is a schematic view showing how the combined center of gravity of the armature and the actuator coincides with the axis of rotation of the moving system.

Although the magnetic structure just described has advantages from a magnetic viewpoint, it does not provide a balanced armature, and as shown in FIG. 5, the center of gravity 27 of the armature 26 per se is some distance from the armature axis of rotation 28. In a preferred embodiment of the relay of this invention, however, a number of contacts are to be operated, and these contacts are disposed in a parallel arrangement along the header (FIG. 1). To operate these contacts an actuator bar 52 is provided passing down the row of contacts, as shown in FIG. 1. As will be explained in more detail hereinafter, and in accordance with the invention, it is inconvenient and undesirable to have the actuator bar 52 on the axis of rotation 28. The actuator bar 52 thus represents an unbalanced mass having a center of gravity 51, as shown schematically in FIG. 5. In accordance with the invention, by suitable proportioning of the actuator bar 52, its unbalanced mass can be made to exactly compensate for the unbalanced mass of the armature 26 so that the combined center of gravity of the system exactly coincides with the axis of rotation of the armature 28, as shown schematically in FIG. 5. It will thus be noted, that the axis of rotation of the entire moving system is the same as the axis of rotation 28 of the armature 26. It will also be noted, that although the moving system is unsymmetrical about its axis, it is nevertheless balanced.

In accordance with the invention, the relay magnet structure also includes a bridge 38. The bridge 38 serves to hold the legs 12, 14 of the U-shaped magnet in spaced relationship and also provides a bearing 40 for the armature pivot pin 42. The armature 26 includes a stud 44 which anchors one end of the armature return spring 46, and the other end of the return spring 46 is secured by anchor 48 on the bridge 38. The bridge 38 is made of a non-magnetic material, such as brass, and another projection or stop 50 on the bridge 38 serves as the limit stop for the return motion of the armature.

In accordance with the invention means are included that provide a maximum amount of free space on the header 10 for location of the relay electrical system. As embodied, this means comprises the armature actuator bar 52 which is rigidly attached to the armature 26, such as by welding or soldering, and is of a non-magnetic material. As shown at 54, one end of the armature actuator bar is fixedly secured to the armature 26, while the other end of the armature actuator bar 52 as shown at 54 is supported for rotation upon pivot pin 58, the end of which is in turn supported by bracket 60 which is carried by header 10.

The present embodiment of the relay includes a plurality of double-throw electrical switches that comprise a row of normally-closed fixed contact terminal pins 62 farthest removed from the actuator bar 52, as shown in FIG. 1. These normally-closed fixed contact terminal pins 62, as do all terminal pins on the relay, extend completely through the header 10 and are insulated from it by suitable material 24, such as glass, as shown in FIG. 1 and more particularly in FIG. 2. A normally-closed fixed contact 64 is carried by each fixed contact terminal pin 62; however, only one normally-closed fixed contact is shown in FIG. 1 to avoid unnecessary and confusing detail in the drawings. In actuality, there would be four normally-closed fixed contacts 64, one for each fixed contact terminal pin 62 of the relay, as shown in FIG. 1.

A second row of terminal pins 66, or normally-open fixed contact terminal pins 66, is provided in the row of terminal pins 66 next farthest removed from the actuator bar 52, or as the center row of terminal pins 66, as shown in FIG. 1. Each of these normally-open fixed contact terminal pins 66 carries a normally-open fixed contact 68. The normally-open fixed contacts 68 are formed from resilient material and contribute to overtravel when the relay is actuated. Finally, the row of terminal pins 70 closest to the actuator bar carry the movable contacts 72 which are also formed from a resilient material and are of the nature of leaf springs. In the embodiment shown, the movable contacts 72 are preset or biased against the normally-closed fixed contacts 64.

In accordance with the invention, the actuator bar 52 carries a plurality of actuators or fingers 74, as shown in FIG. 1, and each finger is provided with an electrically insulated tip 76, which is preferably formed from a ceramic material. There is one finger 74 for each movable contact 72, and in the relay shown in the drawings there would be four such fingers, and there would be four such movable contacts. It will be observed that a set comprising a normally-closed fixed contact 74, a normally-open fixed contact 68 and a movable contact 72 comprises a double-throw electrical switch.

Figure 4:
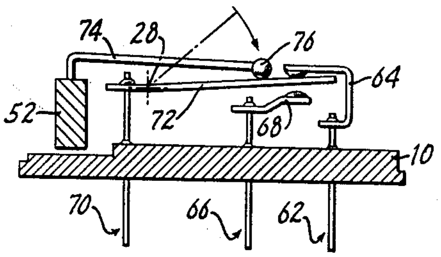
FIG. 4 is a sectional view taken along the line 4—4 of FIG. 1 and showing how the axis of rotation of the moving system and the flexure axis of the movable contacts coincide.

As described above, and aside from the wish to balance the armature 26, it is desired that the actuator bar 52 not lie on the axis of rotation 28 for another reason, as best illustrated in FIG. 4. Although the movable contact 72 (FIG. 4) bends rather than pivots, it moves through an arc as if it were mounted on a pivot, or flexure axis. In FIG. 4, and in accordance with the invention, the flexure axis of the movable contact 72 coincides with the axis of rotation 28 of the moving system and perforce with the axis of rotation of the finger 74 which is a part of the moving system. If the finger 74 that operates the movable contact 72 had its pivot or axis of rotation at some distance from the flexure axis of the movable contact, there would be a scrubbing or sliding action between the tip 76 on the finger and the surface of the movable contact. This undesirable sliding action would cause wear and galling, as well as wasting energy in friction. In accordance with the invention, however, the pivot of the finger 74 is substantially identical with the flexure axis of the movable contact 72, and there is no sliding action between the tip 76 of the finger and the surface of the movable contact. Since it would obviously be impractical to have a solid shaft extending down through the flexure axis of a row of movable contacts, the actuator bar 52 must be mounted to one side of the flexure axis (and pivot) and this in turn provides the unbalanced mass that is used, as previously described, to balance the unbalanced mass of the armature 26.

In accordance with the invention means are provided in the header 10 for decreasing the overall mounting height of the relay. As embodied, such means, as best shown in FIG. 3, comprise a coil recess 78 and an actuator bar recess 80. The coil recess 78 enables the size of the coil 18 of the U-shaped magnet to be increased without increasing the overall mounting height of the relay. Similarly, the actuator bar recess 80 enables the actuator bar 52 to be made of a desired size and shape and provides clearance for its movements when the relay is operated. In the present preferred embodiment of the invention, the center of gravity 51 of the actuator bar 52 (FIG. 5) is below the center of gravity 27 of the armature 26, and therefore the actuator bar 52 must be close to the header 10, necessitating the recess 80.

In operation, and as best shown in FIG. 1, when the relay is energized by causing an electric current to flow through the coil 18, magnetic flux is caused to flow around the magnetic circuit, i.e., through the U-shaped magnet 12, 16, 14 and its associated rotary armature 26. As the flux flows, the magnetic circuit tends to align itself in the position that will provide the lowest reluctance path for the flux. The rotary armature 26 is thus magnetically attracted to the working pole face 36 across the working air gap 30, and the armature is caused to rotate in a clockwise direction as shown in FIG. 1.

When the armature rotates, the actuator bar 52 also rotates, and the fingers 74 carried by the actuator bar engage the resilient movable contacts 72 and move them out of engagement with the normally-closed fixed contacts 64 and into engagement with the resilient normally-open fixed contacts 68. The relay is shown in FIG. 1 in the de-energized position. When current ceases to flow through the coil, the return spring 46 and the normal bias of the movable contacts 72 against the normally-closed fixed contacts 64 acting against the fingers 74 provide the necessary force to return the moving system, including the armature 26 and the actuator bar 52, to the de-energized position as shown in FIG. 1. In the de-energized position the fingers 74 are preferably out of contact, i.e., do not touch the movable contacts 72, and the movable contacts are free to return to the normal position of their bias against the normally-closed fixed contacts 64. The fingers 74 are preferably made of a stiff elastic wire so that the fingers will have some give to them and contribute to over-travel of the relay in the energized position. Both the movable contacts 72 and the fixed contacts 68 themselves also contribute to over-travel because of their inherent resiliency.

It will be noted from FIG. 1 that all of the operating parts of the relay structure are readily accessible and permit adjustment and calibration of the relay as an operating relay. Once the relay has been properly assembled, adjusted and calibrated, a cover 78, as shown in phantom line in FIG. 2, may be placed over it and sealed to the header 10. This enclosure or cover 78 and the header 10 with its seals 24 provide a means for hermetically sealing the entire relay structure to permit operation at high altitudes and prevent contamination of the electrical contacts.

In accordance with the invention, a new and improved shock and vibration resistant, high performance military relay is provided that achieves an extremely low overall mounting height without sacrifice of relay performance and operating characteristics, and that permits almost any desired number of double-throw electrical switches to be included in one structure without increasing the overall mounting height. As will be apparent from FIG. 1, if one desired to include additional electrical switches in one enclosure this could be done by merely extending the length of the relay and without adding to the overall mounting height. It is also possible to even further increase the number of switches and power of the relay by duplicating the U-shaped magnet and rotary armature at the opposite end of the relay, or where the bracket 60 is shown in the present embodiment. By this arrangement the available power for operation of the switches may be doubled, making it possible to use a large number of switches in one relay.

The invention in its broader aspects is not limited to the specific details shown and described, but departures may be made from such details within the scope of the accompanying claims without departing from the principles of the invention and without sacrificing its chief advantages.

What is claimed is:

1. An electromagnetic relay comprising a header, a U-shaped electromagnet carried by the header, a moving system having an axis of rotation and comprising a rotary armature and an actuator carried by the rotary armature and rotatable therewith, the U-shaped electromagnet having two spaced-apart legs, the rotary armature having one end extending toward and forming a working air gap with one leg of the electromagnet, the other end of the armature being adjacent to and forming a non-working air gap with the other leg of the electromagnet, the axis of rotation being adjacent the non-working air gap, the center of gravity of the moving system being on its axis of rotation so that the moving system is balanced about its axis, at least one fixed contact carried by the header, at least one movable contact carried by the header, and means carried by the actuator adapted to engage the movable contact to move it when the moving system is rotated responsive to energization of the electromagnet.

2. The invention as defined in claim 1, in which the center of gravity of the armature is on one side of the axis of rotation and the center of gravity of the actuator is on the opposite side of the axis of rotation from the center of gravity of the armature.

3. The invention as defined in claim 1, in which the axis of rotation of the moving system is substantially parallel to the header.

4. The invention as defined in claim 3, in which the electromagnet includes a coil, and in which the header includes a recess that receives a portion of the coil.

5. The invention defined in claim 1, in which the movable contact is biased against the fixed contact and in which the means moves the movable contact out of engagement with the fixed contact, when the moving system is rotated responsive to energization of the electromagnet.

6. The invention defined in claim 1, in which the movable contact is spaced from the fixed contact and in which the means moves the movable contact into engagement with the fixed contact, when the moving system is rotated responsive to energization of the electromagnet.

7. The invention as defined in claim 1, which includes at least two fixed contacts arranged as a pair and in which the movable contact is biased against one of the pair of fixed contacts and in which the means moves the movable contact out of engagement with the one fixed contact of the pair and into engagement with the other fixed contact, when the moving system is rotated responsive to energization of the electromagnet.

8. An electromagnetic relay comprising a header, a U-shaped electromagnet having a pair of spaced-apart legs, the U-shaped electromagnet being carried by the header, a rotary armature having an axis of rotation, one end of the rotary armature extending toward one leg of the electromagnet and forming a working air gap therewith, the other end of the armature being adjacent the axis of rotation and forming a non-working air gap with the other leg of the electromagnet, the axis of rotation being substantially parallel to the header, at least one movable contact carried by the header, at least one pair of spaced-apart fixed contacts carried by the header, the movable contact being biased against one contact of the pair of fixed contacts, the armature including an actuator bar, at least one actuator secured to the actuator bar and adapted to engage the movable contact to move it out of engagement with the one fixed contact of the pair and into engagement with the other fixed contact of the pair when the armature is rotated, and the center of gravity of the armature being on the axis of rotation so that the armature including the actuator bar is balanced about its axis.

9. The invention as defined in claim 8, which also includes a plurality of movable contacts, a plurality of pairs of fixed contacts, and a plurality of actuators.

10. The invention as defined in claim 9, in which the actuator is a stiff but resilient wire with an insulated tip.

11. The invention as defined in claim 8, which also includes a bridge spanning the space between the legs of the U-shaped magnet above the rotary armature, in which the armature includes a pivot that is supported for rotation by the bridge, in which the armature carries a return spring, and in which the end of the armature actuator includes a pivot, and in which the armature actuator pivot is supported from the header.

12. The invention as defined in claim 8, in which the header carries a cover that covers the entire operating mechanism of the relay.

13. The invention as defined in claim 8, in which the movable contact is resilient and possesses a flexure axis about which it rotates and in which the flexure axis coincides with the axis of rotation of the armature.

14. The invention as defined in claim 8, in which said other fixed contact is resilient and capable of contributing to overtravel, when the movable contact is moved into engagement with it.

References Cited by the Examiner

UNITED STATES PATENTS

| | | | |
|---|---|---|---|
| 2,931,871 | 4/60 | Dowds | 200—87 |
| 3,033,957 | 5/62 | Dean | 200—87 |
| 3,042,775 | 7/62 | Jordan | 317—197 |
| 3,051,804 | 8/62 | Mayer | 317—198 |
| 3,114,808 | 12/63 | Van Zyl | 200—87 |
| 3,118,033 | 1/64 | Somers et al. | 200—104 |
| 3,121,148 | 2/64 | Wells et al. | 200—102 |

BERNARD A. GILHEANY, *Primary Examiner.*

ROBERT K. SCHAEFER, *Examiner.*